UNITED STATES PATENT OFFICE.

HARRY P. BASSETT, OF CYNTHIANA, KENTUCKY.

PROCESS OF TREATING DISTILLERS' SLOPS.

1,357,138.   Specification of Letters Patent.   Patented Oct. 26, 1920.

No Drawing. Application filed November 3, 1919, Serial No. 335,486. Renewed September 10, 1920. Serial No. 409,487.

*To all whom it may concern:*

Be it known that I, HARRY P. BASSETT, a citizen of the United States, residing at Cynthiana, in the county of Harrison and State of Kentucky, have invented certain new and useful Improvements in Processes of Treating Distillers' Slops, of which the following is a specification.

This invention relates to processes of treating distillers' slops for the purpose of removing glycerin therefrom. The invention also provides means for the economical separation and recovery of the greater part or all of the potassium content of the slops.

This process is an improvement on my processes of treating distillers' slops described and claimed in my co-pending applications, Serial Numbers 310,437 and 310,438, filed July 12, 1919.

It is known that distillers' slops and particularly the slops resulting from the production and separation of alcohol from black strap molasses, contain in addition to ordinary and invert sugar, other carbohydrates, such as unfermentable sugars, (raffinose and the like) starches and gums. The presence of these carbohydrates or certain of them, interferes with the satisfactory, economical separation of glycerin from distillers' slops.

I have discovered that the carbohydrates present in distillers' slops including unfermentable sugars, starches, and gums can be decomposed in the manner hereinafter described, with the production of organic compounds which do not interfere with the satisfactory separation of the glycerin and the glycerin readily and economically recovered.

In the preferred practice of my process, distillers' slops, preferably slops resulting from the treatment of black strap molasses, are preferably filtered to remove the sediment contained therein. The filtrate which is in the form of a dark brown liquid, is treated with a soluble salt of a metal adapted (*a*), to form hydroxids of different degrees of oxidation, and (*b*), to form an insoluble basic salt with acids of the volatile fatty acid series and in practice, I prefer to employ an iron or maganese salt, such as ferrous or ferric sulfate or manganous or manganic sulfate, and I prefer to add one or more of these salts in the approximate proportions of from 2 to 4 parts by weight to 100 parts by weight of the liquor.

The slops may be heated to boiling prior to the addition of the metal salt or salts referred to or such slops and the salt added thereto may be heated to boiling and, in practice, I continue the boiling for from 5 to 10 minutes after the addition of the salt to the slops.

In the use of a soluble iron salt, as described, the solution turns to a dark color approximating black upon the addition of the iron salt thereto.

To the heated mixture of slops and added salt, I now add a sufficient quantity of an alkaline earth metal hydroxid, preferably calcium hydroxid, to transform the metal present in the added salt into a hydroxid, and I prefer to add a slight excess of such alkaline earth metal hydroxid. I have found in practice, in making use of ferrous or ferric sulfate, and calcium hydroxid, that it is advisable to add a slightly greater quantity by weight of the calcium hydroxid than of the iron salt.

Upon the addition of the alkaline earth metal hydroxid, the liquor under treatment turns to a light green color. The mixture is then boiled, preferably for several hours and air is blown through the boiling mixture, throughout the boiling operation.

It will be understood that upon the addition of the alkaline earth metal hydroxid, the added soluble metal salt, as for example, iron sulfate is transformed into a hydroxid, as for example, iron hydroxid. It will also be understood that the addition of the oxygen by blowing air through the boiling solution, serves to maintain the metal hydroxid in its more completely oxidized condition, the tendency of the carbohydrates present being to reduce the salt to its lower state of oxidation as, for example, in the case of an iron salt to the ferrous condition, but the addition of atmospheric oxygen effects its oxidation to the ferric condition.

The boiling and the passage of air through the solution are continued until a filtered test sample has an amber color. At such time, the carbohydrates present have formed an insoluble basic compound with the metal of the metal hydroxid.

The resulting product is then filtered to remove such insoluble salts. To the filtrate is then added a sufficient quantity of an acid to effect the neutralization of the filtrate and to produce an acid condition therein. A sufficient degree of acidity is obtained by adding one-half of one per cent. by weight, of a mineral acid in excess of the amount of such acid necessary to neutralize the solution. In the practice of my process, I ordinarily add from 1 to 1½ per cent. by weight of a mineral acid to the filtrate and I prefer to add sulfuric acid although I may use other acids or I may use acid salts to produce such acidification as will be readily understood by those skilled in the art.

In using sulfuric acid to effect the acidification of the filtrate, a deposit, believed to consist principally of calcium sulfate, is formed. This readily precipitates and the liquid can be readily separated therefrom by decantation or otherwise.

The clear liquor is then concentrated, preferably to from about 2 to 5 per cent. of its original volume, the concentration being preferably effected by heating the liquor under reduced atmospheric pressure. As a result of such concentration, the greater part, ordinarily from about ⅔ to ¾ per cent. by weight, of the potassium salts present are precipitated. The liquid is then separated from these potassium salts by decantation or otherwise and the glycerin separated therefrom, preferably by distillation in the presence of steam. All of the glycerin may be distilled over, but I have found it advantageous from the standpoint of economy to distil over only about from 90 to 95 per cent. of the glycerin and to add the residue in the still to a new batch of distillers' slops.

Glycerin obtained as described is of a light straw color, but if it is desired to obtain glycerin which is water white, the solution obtained after the separation of the organic metal salts may be filtered through bone black which effectively decolorizes it.

The organic salts separated by filtration may be advantageously employed as a filtering medium in filtering the untreated distillers' slops.

While I have described in detail the preferred practice of my process, it is to be understood that the proportions of reagents employed, and the details of procedure may be varied, and that known chemical equivalents of the reagents used may be employed, all without departing from the spirit of my invention or the scope of the subjoined claims.

Having thus described by invention, I claim:

1. A process of treating distillers' slops, comprising subjecting them to the action of a hydroxid in a higher state of oxidation, of a metal adapted to form hydroxids having different degrees of oxidation, such metal being adapted to form an insoluble basic salt with acids of the volatile fatty acid series, subjecting such hydroxid to oxidizing treatment to maintain it in its higher state of oxidation, acidifying the liquid, and separating glycerin from the remaining liquid.

2. A process of treating distillers' slops, comprising subjecting them to the action of ferric hydroxid, subjecting such hydroxid to oxidizing treatment to transform ferrous hydroxid produced by the action of organic constituents of the slops into ferric hydroxid, acidifying the liquid, and separating glycerin from the remaining liquid.

3. A process of treating distillers' slops, comprising subjecting them to the action of a hydroxid in a higher state of oxidation, of a metal adapted to form hydroxids having different degrees of oxidation, such metal being adapted to form an insoluble basic salt with acids of the volatile fatty acid series, subjecting such hydroxid to oxidizing treatment to maintain it in its higher state of oxidation, separating the precipitate formed, acidifying the liquid, and separating glycerin from the remaining liquid.

4. A process of treating distillers' slops, comprising subjecting them to the action of ferric hydroxid, subjecting such hydroxid to oxidizing treatment to transform ferrous hydroxid produced by the action of organic constituents of the slops into ferric hydroxid, separating the precipitate consisting of basic salts of the fatty acid series formed, acidifying the liquid, and separating glycerin from the remaining liquid.

5. A process of treating distillers' slops, comprising subjecting them to the action of a hydroxid in a higher state of oxidation, of a metal adapted to form hydroxids having different degrees of oxidation, such metal being adapted to form an insoluble basic salt with acids of the volatile fatty acid series, simultaneously subjecting such salt to oxidizing treatment to maintain it in its higher state of oxidation, separating the resulting precipitate formed, acidifying the liquid, evaporating the resulting liquid to separate potash salts therefrom, and removing glycerin from the remaining liquid.

6. A process of treating distillers' slops, comprising subjecting them to the action of a hydroxid in a higher state of oxidation, of a metal adapted to form hydroxids having different degrees of oxidation, such metal being adapted to form an insoluble basic salt with the acids of the volatile fatty acid series, subjecting such hydroxid to oxidizing treatment to maintain it in its higher state of oxidation, separating the resulting precipitate formed, rendering the remaining liquid slightly acid, evaporating the acidified solution to remove potash salts therefrom, and removing glycerin from the remaining liquid.

7. A process of treating distillers' slops, comprising heating them in the presence of a hydroxid in a higher state of oxidation, of a metal adapted to form hydroxids having different degrees of oxidation, such metal being adapted to form an insoluble basic salt with acids of the volatile fatty acid series, blowing air through the solution to maintain the hydroxid in its higher state of oxidation, separating the resulting precipitate formed, acidifying the liquid, and separating glycerin from the remaining liquid.

8. A process of treating distillers' slops, comprising heating them in the presence of a hydroxid in a higher state of oxidation, of a metal adapted to form hydroxids having different degrees of oxidation, such metal being adapted to form an insoluble basic salt with acids of the volatile fatty acid series, simultaneously subjecting such hydroxid to oxidizing treatment to maintain it in its higher state of oxidation, continuing such treatment until a filtered test sample is of an amber color, separating the resulting precipitate formed, acidifying the liquid, and separating glycerin from the remaining liquid.

9. A process of treating distillers' slops which consists in adding thereto a salt of a metal adapted to form hydroxids having different degrees of oxidation, such metal being adapted to form an insoluble basic salt with acids of the volatile fatty acid series and an alkaline earth metal hydroxid, adapted to react with said salt to produce a hydroxid of the metal in the first named salt, subjecting such hydroxid to oxidizing treatment, separating the resulting precipitate formed, acidifying the liquid, and separating glycerin from the remaining liquid.

10. A process of treating distillers' slops, comprising adding thereto iron sulfate and an alkaline earth metal hydroxid adapted to react with the said salt to produce a hydroxid of iron, heating the mixture to produce iron hydroxid, subjecting such hydroxid to oxidizing treatment to maintain it in its higher state of oxidation, continuing the treatment until a filtered test sample of the liquor is of an amber color, separating the resulting precipitate formed, acidifying the liquid, and separating glycerin from the remaining liquid.

In testimony whereof I affix my signature in presence of two witnesses.

HARRY P. BASSETT.

Witnesses:
MARY F. LYONS,
JOSEPH HARRISON.